United States Patent
Nakahara et al.

(10) Patent No.: US 9,192,917 B2
(45) Date of Patent: Nov. 24, 2015

(54) EXHAUST GAS PURIFYING CATALYST AND PRODUCTION METHOD FOR SAME

(75) Inventors: Yunosuke Nakahara, Saitama (JP); Ohki Houshito, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 174 days.

(21) Appl. No.: 13/808,824

(22) PCT Filed: Jul. 5, 2011

(86) PCT No.: PCT/JP2011/065331
§ 371 (c)(1),
(2), (4) Date: Jan. 7, 2013

(87) PCT Pub. No.: WO2012/005235
PCT Pub. Date: Jan. 12, 2012

(65) Prior Publication Data
US 2013/0116117 A1    May 9, 2013

(30) Foreign Application Priority Data
Jul. 8, 2010   (JP) ................................. 2010-156149

(51) Int. Cl.
| | |
|---|---|
| *B01J 23/58* | (2006.01) |
| *B01D 53/94* | (2006.01) |
| *B01J 37/02* | (2006.01) |
| *B01J 23/63* | (2006.01) |
| *B01J 35/00* | (2006.01) |
| *B01J 35/04* | (2006.01) |
| *B01J 37/00* | (2006.01) |

(52) U.S. Cl.
CPC .............. *B01J 23/58* (2013.01); *B01D 53/945* (2013.01); *B01J 23/63* (2013.01); *B01J 35/0066* (2013.01); *B01J 35/04* (2013.01); *B01J 37/0036* (2013.01); *B01J 37/0201* (2013.01); *B01J 37/0244* (2013.01); *B01D 2255/1023* (2013.01); *B01D 2255/2042* (2013.01); *Y02T 10/22* (2013.01)

(58) Field of Classification Search
CPC ........ B01J 23/58; B01J 35/04; B01J 35/0066; B01J 37/0036; B01J 37/0201; B01J 37/0244; B01J 23/63; B01D 53/945; B01D 2255/2042; B01D 2255/1023; Y02T 10/22
USPC ........ 502/328, 335, 101; 423/213.2; 422/177, 422/179; 429/532
See application file for complete search history.

(56) References Cited

U.S. PATENT DOCUMENTS

| | | | |
|---|---|---|---|
| 4,711,872 | A | 12/1987 | Kato et al. |
| 5,348,717 | A | 9/1994 | Clavenna et al. |
| 6,069,111 | A | 5/2000 | Yamamoto et al. |
| 7,923,407 | B2 | 4/2011 | Goto |
| 2004/0086440 | A1 | 5/2004 | Labarge et al. |

FOREIGN PATENT DOCUMENTS

| | | |
|---|---|---|
| CN | 101069845 | 11/2007 |
| JP | 61-245844 | 11/1986 |
| JP | 5-262517 | 10/1993 |
| JP | 06-099069 | 4/1994 |
| JP | 07-171392 | 7/1995 |
| JP | 08-281071 | 10/1996 |
| JP | 08-323205 | 12/1996 |
| JP | 09-248462 | 9/1997 |
| JP | 2004-122077 | 4/2004 |
| JP | 2006-088058 | 4/2006 |
| JP | 2007-275878 | 10/2007 |

OTHER PUBLICATIONS

Avvakumov, G.V., Senna, Mamoru, Kosova, N. V. "Soft Mechanochemical Synthesis: A Basis for New Chemical Technologies" 2001, Springer Science+Business Media LLC, Chapter 6, p. 83-p. 84.*
Chinese Official Action—201180033630.3—Apr. 1, 2014.
International Search Report, PCT/JP2011/065331, Oct. 18, 2011.
Koichi Eguchi et al., "Koon Nensho Shokubai no Choseiho", Shokubai Chosei no Shinpo, Mar. 2000, pp. 69 to 74.

* cited by examiner

*Primary Examiner* — Colleen Dunn
*Assistant Examiner* — Haytham Soliman
(74) *Attorney, Agent, or Firm* — Young & Thompson

(57) ABSTRACT

Disclosed is an exhaust gas purifying catalyst which includes barium hexaaluminate, and palladium and barium which are supported on barium hexaaluminate, wherein the amount of supported palladium, as reduced to metallic Pd, is 0.2 to 3.5 mass % with respect to the mass of barium hexaaluminate; the amount of supported barium, as reduced to BaO, is 1 to 20 mass % with respect to the mass of barium hexaaluminate; and the ratio by mole of supported barium to supported palladium, Ba/Pd, is (0.5 to 10)/1; an exhaust gas purifying catalyst product which has a catalyst support made of a ceramic or metallic material, and a layer which is formed of the exhaust gas purifying catalyst as a predominant component and which is supported on the catalyst support; and a method for producing the exhaust gas purifying catalyst product.

5 Claims, No Drawings

EXHAUST GAS PURIFYING CATALYST AND PRODUCTION METHOD FOR SAME

TECHNICAL FIELD

The present invention relates to an exhaust gas purifying catalyst and to a method for producing the catalyst. More particularly, the invention relates to a catalyst which has a high Pd dispersion degree, which exhibits excellent exhaust gas purifying performance even after long-term use thereof under high-temperature conditions, and which removes toxic components contained in exhaust gas discharged from an internal combustion engine of, for example, an automobile, and to a method for producing the catalyst.

BACKGROUND ART

Exhaust gas discharged from an internal combustion engine of, for example, an automobile contains toxic components such as hydrocarbons (HC), carbon monoxide (CO), and nitrogen oxides ($NO_x$). Hitherto, three-way catalysts have been used for removing such toxic components for detoxifying the exhaust gas.

Such three-way catalysts include a noble metal (e.g., Pt, Pd, or Rh) serving as a catalytically active component; a material such as alumina, ceria, zirconia, or oxygen storing capacity ceria-zirconia composite oxide, serving as a carrier; and a catalyst support made of a ceramic or metallic material and having a shape of honeycomb, plate, pellet, etc. Recently, the regulation of automobile exhaust gas has been more strict, and the prices of Pt and Rh, which are noble metals serving as a main catalytically active component of internal combustion engine, exhaust gas purifying catalysts have risen. Under such circumstances, efforts have been made on reduction of exhaust gas purifying catalyst production cost by use of relatively cheap Pd as a catalytically active component, and various means therefor have been proposed (see, for example, Patent Documents 1, 2, and 3). In order to obtain enhanced exhaust gas purifying performance of Pd, studies have been intensively conducted on the functions of metal oxides such as $Al_2O_3$, $CeO_2$, and $ZrO_2$, serving as a catalyst carrier. However, to cope with variation in price of Pd due to increased demand thereof and to meet the demand of cost reduction by automobile manufactures, there is demand for an exhaust gas purifying catalyst which ensures effective cleaning performance by use of Pd in a reduced amount.

PRIOR ART DOCUMENTS

Patent Documents

Patent Document 1: Japanese Patent Application Laid-Open (kokai) No. H06-099069
Patent Document 2: Japanese Patent Application Laid-Open (kokai) No. H07-171392
Patent Document 3: Japanese Patent Application Laid-Open (kokai) No. H08-281071

SUMMARY OF THE INVENTION

Problems to be Solved by the Invention

When a three-way catalyst containing noble metal oxides is operated under high-temperature conditions, oxygen atoms dissociate from the noble metal oxides, to thereby form the corresponding noble metals. In this case, sintering of the noble metals is thought to be accelerated. Among noble metals, Pd dissociates from the oxide thereof at low temperature, and sintering of the generated Pd readily occurs. The Pd sintering is thought to be a main cause for deterioration of the catalyst. Even when lanthanum-stabilized alumina (La—$Al_2O_3$), having such a heat resistance as evaluated in the art, is employed as a Pd carrier, sintering of Pd occurs at very high rate at high temperature under accelerated conditions, causing considerable deterioration of catalyst performance. Thus, one conceivable approach for preventing Pd sintering is to form the Pd carrier contained in a three-way catalyst from a material having higher heat resistance, and studies have been conducted on a variety of highly heat-resistance materials.

An object of the present invention is to provide an exhaust gas purifying catalyst having a high Pd dispersion degree, and exhibiting excellent exhaust gas purifying performance even after long-term use thereof under high-temperature conditions. Another object is to provide a method for producing the catalyst.

Means for Solving the Problems

The present inventors have conducted extensive studies in order to attain the aforementioned objects, and have found that an exhaust gas purifying catalyst having a high Pd dispersion degree, and exhibiting excellent exhaust gas purifying performance even after long-term use thereof under high-temperature conditions can be produced by use of barium hexaaluminate as a catalyst carrier and causing palladium and barium to be supported on barium hexaaluminate at a specific metal/carrier ratio. The present invention has been accomplished on the basis of this finding.

Accordingly, the present invention provides an exhaust gas purifying catalyst, characterized in that the catalyst comprises barium hexaaluminate, and palladium and barium which are supported on barium hexaaluminate, wherein the amount of supported palladium, as reduced to metallic Pd, is 0.2 to 3.5 mass % with respect to the mass of barium hexaaluminate; the amount of supported barium, as reduced to BaO, is 1 to 20 mass % with respect to the mass of barium hexaaluminate; and the ratio by mole of supported barium to supported palladium, Ba/Pd, is (0.5 to 10)/1.

Preferably, the exhaust gas purifying catalyst of the present invention is characterized in that the catalyst comprises barium hexaaluminate, and palladium and barium which are supported on barium hexaaluminate, wherein the amount of supported palladium, as reduced to metallic Pd, is 1 to 3.5 mass % with respect to the mass of barium hexaaluminate; the amount of supported barium, as reduced to BaO, is 2 to 15 mass % with respect to the mass of barium hexaaluminate; and the ratio by mole of supported barium to supported palladium, Ba/Pd, is (2 to 4.5)/1.

The present invention provides an exhaust gas purifying catalyst product, characterized by comprising a catalyst support made of a ceramic or metallic material, and a layer which is formed of the exhaust gas purifying catalyst as a predominant component and which is supported on the catalyst support.

The present invention also provides a method for producing an exhaust gas purifying catalyst product, characterized in that the method comprises dispersing a barium hexaaluminate first slurry which has been subjected to wet grinding in an aqueous solution containing a water-soluble palladium compound and a water-soluble barium compound, to thereby form a second slurry; applying the second slurry onto a catalyst support made of a ceramic or metallic material; and drying and firing the second slurry applied on the catalyst support.

Effects of the Invention

The exhaust gas purifying catalyst of the present invention and the exhaust gas purifying catalyst product of the present invention have a high Pd dispersion degree, and exhibit excellent exhaust gas purifying performance even after long-term use thereof under high-temperature conditions. The production method of the present invention is suited for producing the exhaust gas purifying catalyst of the present invention.

MODES FOR CARRYING OUT THE INVENTION

The barium hexaaluminate which is employed as a carrier in the present invention is a known compound and may be produced through a variety of production methods. Examples of production methods include those disclosed in Japanese Patent Application Laid-Open (kokai) Nos. H6-239613, H7-187664, 1-17-187665, and 1-110-287419.

Examples of the barium hexaaluminate which is employed as a carrier in the present invention include $Ba_xAl_yO_z$ (wherein x is 0.75 to 1, y is 10.9 to 12, and z is 17.14 to 19), which may be produced through a known method. Specific examples include $BaAl_{12}O_{19}$, $Ba_{0.75}A_{11}O_{17.25}$, and $Ba_{0.79}Al_{10.9}O_{17.14}$.

The exhaust gas purifying catalyst of the present invention comprises barium hexaaluminate, and palladium and barium which are supported on barium hexaaluminate, wherein the amount of supported palladium, as reduced to metallic Pd, is 0.2 to 3.5 mass %, preferably 1 to 3.5 mass % with respect to the mass of barium hexaaluminate; the amount of supported barium, as reduced to BaO, is 1 to 20 mass %, preferably 2 to 15 mass % with respect to the mass of barium hexaaluminate; and the ratio by mole of supported barium to supported palladium, Ba/Pd, is (0.5 to 10)/1, preferably (2 to 4.5)/1. When any of the amount of supported palladium, the amount of supported barium, and the ratio by mole of supported barium to supported palladium falls outside the aforementioned corresponding range, the exhaust gas purifying performance of the exhaust gas purifying catalyst after long-term use thereof under high-temperature conditions fails to be sufficiently improved.

Since the exhaust gas purifying catalyst of the present invention employs barium hexaaluminate as a carrier, the Pd dispersion degree does not decrease even after long-term use thereof under high-temperature conditions, whereby Pd sintering can be suppressed after long-term use thereof under high-temperature conditions.

In addition, since the exhaust gas purifying catalyst of the present invention contains Pd and Ba which are supported on barium hexaaluminate, the oxygen dissociation temperature of PdO can be elevated, whereby the catalytic action of Pd can be enhanced.

The exhaust gas purifying catalyst of the present invention may be produced through, for example, the following method. Specifically, a barium hexaaluminate first slurry which has been subjected to wet grinding and which has a D50 of 3 to 15 μm and a D90 of 7 to 40 μm is dispersed in an aqueous solution containing a water-soluble palladium compound (e.g., palladium nitrate, palladium chloride, or palladium sulfate) and a water-soluble barium compound (e.g., barium oxide, barium nitrate, barium acetate, barium oxalate, barium hydroxide, or barium carbonate), and the dispersion is stirred, to thereby form a second slurry. In the above step, the ratio in amount of palladium compound to that of barium hexaaluminate is adjusted so that the amount of palladium, as reduced to metallic Pd, is 0.2 to 3.5 mass %, preferably 1 to 3.5 mass % with respect to the mass of barium hexaaluminate; the ratio in amount of Ba compound to that of barium hexaaluminate is adjusted so that the amount of barium, as reduced to BaO, is 1 to 20 mass %, preferably 2 to 15 mass % with respect to the mass of barium hexaaluminate; and the ratio by mole of barium to palladium, Ba/Pd, is (0.5 to 10)/1, preferably (2 to 4.5)/1. Subsequently, the second slurry is evaporated to dryness and fired, to thereby yield the exhaust gas purifying catalyst of the present invention.

The exhaust gas purifying catalyst product of the present invention has a catalyst support made of a ceramic or metallic material, and a layer which is formed of the exhaust gas purifying catalyst of the present invention and which is supported on the catalyst support. In the exhaust gas purifying catalyst product, no particular limitation is imposed on the shape of the catalyst support made of a ceramic or metallic material, and the support is generally in the form of honeycomb, plate, pellet, etc. In the case of a honeycomb shape support, the amount of exhaust gas purifying catalyst supported is preferably 30 to 200 g/L, more preferably 50 to 150 g/L. Examples of the material of the catalyst support include ceramic materials such as alumina ($Al_2O_3$), mullite ($3Al_2O_3\cdot2SiO_2$), and cordierite ($2MgO\cdot2Al_2O_3\cdot5SiO_2$), and metallic materials such as stainless steel.

The exhaust gas purifying catalyst product of the present invention may be produced through the following method. Specifically, a barium hexaaluminate first slurry which has been subjected to wet grinding is dispersed in an aqueous solution containing a water-soluble palladium compound (e.g., palladium nitrate, palladium chloride, or palladium sulfate) and a water-soluble barium compound (e.g., barium oxide, barium nitrate, barium acetate, barium oxalate, barium hydroxide, or barium carbonate), and the dispersion is stirred, to thereby form a second slurry. In the method, a binder generally employed in three-way catalysts (e.g., alumina) or a carrier such as $CeO_2$—$ZrO_2$ having oxygen storing capacity (OSC) may be co-present. Use of the binder or carrier is preferred. Barium hexaaluminate, the palladium compound, the barium compound, and the binder such as alumina are used in amounts so as to meet the following conditions. The amount of palladium, as reduced to metallic Pd, is 0.2 to 3.5 mass %, preferably 1 to 3.5 mass % with respect to the mass of barium hexaaluminate. The amount of barium, as reduced to BaO, is 1 to 20 mass %, preferably 2 to 15 mass % with respect to the mass of barium hexaaluminate. The ratio by mole of barium to palladium, Ba/Pd, is (0.5 to 10)/1, preferably (2 to 4.5)/1. The ratio by mass of alumina to barium hexaaluminate is 0 to 0.33 mass %.

The thus-prepared second slurry is applied onto a catalyst support made of a ceramic or metallic material through a widely known method. The catalyst support is preferably a honeycomb-shape catalyst support. Subsequently, the applied slurry is evaporated to dryness overnight (about 15 hours) at 90 to 150° C. so that both the Pd compound and the Ba compound are substantially uniformly dispersed on the carrier. The thus-prepared catalyst-on-support is fired in air at 450 to 750° C. for 1 to 5 hours. Thus, the exhaust gas purifying catalyst product of the present invention in which both Pd and Ba are supported on barium hexaaluminate is produced.

The present invention will next be described in detail by way of Examples and Comparative Examples.

EXAMPLES 1 TO 4 AND COMPARATIVE EXAMPLES 1 TO 2

A barium hexaaluminate (BHA) slurry was subjected to wet grinding, to thereby regulate the particle size of the slurry. The slurry was dispersed in an aqueous solution containing palladium nitrate and barium nitrate, and lanthanum-stabilized alumina was added to the slurry under stirring, to thereby prepare a second slurry. In the above procedure, BHA, palladium nitrate, barium nitrate, and lanthanum-stabilized alumina were used so that the relative amounts shown in Table 1 were attained. In Table 1, Pd/BHA mass % is calculated by dividing the mass of palladium (as reduced to metallic Pd) by the mass of BHA; Ba/BHA mass % is calculated by dividing the mass of barium (as reduced to metallic BaO) by the mass of BHA; Ba/Pd mole ratio is a ratio by mole of barium nitrate to palladium nitrate; and alumina/BHA mass % is a ratio of the mass of lanthanum-stabilized alumina to the mass of BHA.

The thus-prepared second slurry was applied to a cordierite honeycomb (catalyst support) at a coating amount of 100 g/L. Subsequently, the applied slurry was evaporated to dryness overnight (about 15 hours) at 120° C. so that both the Pd compound and the Ba compound were substantially uniformly dispersed on the cordierite honeycomb support. The thus-prepared catalyst-on-support was fired in air at 600° C. for 3 hours. Thus, an exhaust gas purifying catalyst product in which both Pd and Ba or Pd were supported on barium hexaaluminate was produced.

Each of the exhaust gas purifying catalyst products obtained in Examples 1 to 4 and Comparative Examples 1 and 2 was placed in an electric furnace maintained at 1,000° C. To the furnace accommodating the catalyst product, a gas which simulated a complete combustion gas and which was composed of $C_3H_6$ (5,000 ppm C), $O_2$ (0.75%), and $N_2$ (balance), and air were alternately and periodically fed for 25 hours (each for 50 seconds). After the treatment of the catalyst product with the simulated exhaust gas, the catalytic activity of the exhaust gas purifying catalyst product was evaluated in the following manner. Specifically, the simulated exhaust gas having the same composition was caused to flow over each of the exhaust gas purifying catalyst products obtained in Examples 1 to 4 and Comparative Examples 1 and 2 at a total flow rate of 25 L/min and an SV of 100,000 h$^{-1}$, after completion of the above treatment. The composition of the outlet gas was measured in a temperature range of 100 to 500° C. by means of a CO/HC/NO analyzer (MOTOR EXHAUST GAS ANALYZER MEXA9100, product of Horiba), whereby the light-off performance of the catalyst product was determined. As a result, the temperature at which 50% of each gas component (CO, HC, or $NO_x$) was removed (T50), and the percent removal at 400° C. (η400) were determined. Table 1 shows the results.

As is clear from the data shown in Table 1, the catalyst activity of the exhaust gas purifying catalyst formed of Pd-on-barium hexaaluminate was enhanced by causing a specific amount of Ba to be deposited on the catalyst carrier. When the mole ratio Ba/Pd was 4.5, the best performance was attained. However, when the amount of Ba increased excessively, the catalytic activity was reduced, as compared with the case where no Ba was added.

EXAMPLES 5 TO 8 AND COMPARATIVE EXAMPLES 3

The procedure of Example 1 was repeated, except that BHA, palladium nitrate, barium nitrate, and lanthanum-stabilized alumina were used so that the relative amounts shown in Table 2 were attained, to thereby produce an exhaust gas purifying catalyst product. The catalytic activity of the thus-produced catalyst product was determined in the same procedure as employed in Example 1. Table 2 shows the results.

TABLE 2

| | Pd/BHA mass % | Ba/BHA mass % | Ba/Pd mole ratio | Alumina/BHA mass % | T50 (° C.) | | | η400 (%) | | |
|---|---|---|---|---|---|---|---|---|---|---|
| | | | | | CO | HC | NO$x$ | CO | HC | NO$x$ |
| Ex. 5 | 1.57 | 7.07 | 4.5 | 0 | 309 | 323 | 358 | 75.8 | 95.1 | 58.9 |
| Ex. 6 | 1.57 | 7.07 | 4.5 | 30 | 311 | 323 | 360 | 75.5 | 94.9 | 58.8 |
| Ex. 7 | 1.57 | 7.07 | 4.5 | 100 | 312 | 324 | 372 | 76.2 | 94.3 | 58.5 |
| Ex. 8 | 1.57 | 7.07 | 4.5 | 300 | 321 | 336 | 398 | 72.2 | 92.1 | 51.4 |
| Comp. Ex. 3 | 1.57 | 7.07 | 4.5 | ∞ | 330 | 344 | 416 | 68.1 | 91.8 | 46.1 |

Comparative Example 3: The value of Pd/BHA is a value of Pd/alumina, and the value of Ba/BHA is a value of Ba/alumina.

As is clear from the data shown in Table 2, the catalytic activity decreased, as the amount of alumina added to BHA increased. When the amount of alumina with respect to the mass of barium hexaaluminate was 100 mass % or lower, particularly 30 mass % or lower, sufficient catalytic activity was attained.

EXAMPLES 9 TO 13

The procedure of Example 1 was repeated, except that BHA, palladium nitrate, barium nitrate, and lanthanum-stabilized alumina were used so that the relative amounts shown in Table 3 were attained, to thereby produce an exhaust gas purifying catalyst product. The catalytic activity of the thus-produced catalyst product was determined in the same procedure as employed in Example 1. Table 3 shows the results.

TABLE 1

| | Pd/BHA mass % | Ba/BHA mass % | Ba/Pd mole ratio | Alumina/BHA mass % | T50 (° C.) | | | η400 (%) | | |
|---|---|---|---|---|---|---|---|---|---|---|
| | | | | | CO | HC | NO$x$ | CO | HC | NO$x$ |
| Comp. Ex. 1 | 1.57 | 0.0 | 0.0 | 100 | 330 | 340 | 410 | 69.8 | 89.6 | 47.5 |
| Ex. 1 | 1.57 | 0.79 | 0.5 | 100 | 322 | 333 | 401 | 71.7 | 91.0 | 49.9 |
| Ex. 2 | 1.57 | 3.14 | 2.0 | 100 | 315 | 332 | 388 | 74.8 | 92.2 | 54.4 |
| Ex. 3 | 1.57 | 7.07 | 4.5 | 100 | 312 | 324 | 372 | 76.2 | 94.3 | 58.5 |
| Ex. 4 | 1.57 | 15.70 | 10.0 | 100 | 328 | 339 | 404 | 71.5 | 90.8 | 49.3 |
| Comp. Ex. 2 | 1.57 | 18.84 | 12.0 | 100 | 345 | 353 | 440 | 65.0 | 87.2 | 39.8 |

TABLE 3

| | Pd/BHA | Ba/BHA | Ba/Pd mole ratio | Alumina/BHA | T50 (° C.) | | | η400 (%) | | |
|---|---|---|---|---|---|---|---|---|---|---|
| | mass % | mass % | | mass % | CO | HC | NOx | CO | HC | NOx |
| Ex. 9 | 0.39 | 7.07 | 18.4 | 100 | 396 | 391 | 518 | 57.6 | 70.0 | 14.7 |
| Ex. 10 | 0.78 | 7.07 | 9.2 | 100 | 365 | 376 | 486 | 62.8 | 74.4 | 22.2 |
| Ex. 11 | 1.57 | 7.07 | 4.6 | 100 | 311 | 323 | 360 | 75.5 | 94.9 | 58.8 |
| Ex. 12 | 2.35 | 7.07 | 3.1 | 100 | 307 | 320 | 356 | 76.7 | 95.1 | 60.1 |
| Ex. 13 | 3.14 | 7.07 | 2.3 | 100 | 303 | 317 | 348 | 78.1 | 95.5 | 61.5 |

As is clear from the data shown in Table 3, the catalytic activity increased until when Pd/BHA increased to 1.57 mass %. However, when the Pd amount further increased, enhancement in catalytic performance commensurate with increasing in Pd amount was not observed.

Degree of Pd Dispersion

The degree of Pd dispersion of the exhaust gas purifying catalyst product of Example 5 and that of Comparative Example 3 were determined before operation thereof under high-temperature conditions. Separately, each exhaust gas purifying catalyst product was placed in an electric furnace maintained at 1,000° C. To the furnace accommodating the catalyst product, a gas which simulated a complete combustion gas and which was composed of $C_3H_6$ (5,000 ppm C), $O_2$ (0.75%), and $N_2$ (balance), and air were alternately and periodically fed for 25 hours (each for 50 seconds). Before the treatment of the catalyst product, and after the treatment of the catalyst product with the simulated exhaust gas, the degree of Pd dispersion was measured according to the CO pulse adsorption method (i.e., a known technique) (T. Takeguchi, S. Manabe, R. Kikuchi, K. Eguchi, T. Kanazawa, S. Matsumoto, Applied Catalysis A: 293 (2005) 91.). The degree of Pd dispersion is calculated by the following formula: degree of Pd dispersion=the amount (by mole) of Pd corresponding to the amount of CO adsorbed/the total amount (by mole) of Pd contained in the catalyst of interest. From the data of the degree of Pd dispersion, percent deterioration of the Pd dispersion degree was determined. Table 4 shows the results.

TABLE 4

| | Catalyst of Ex. 5 | Catalyst of Comp. Ex. 3 |
|---|---|---|
| Pd dispersion degree before high temp. operation | 0.722 | 0.658 |
| Pd dispersion degree after high temp. operation | 0.642 | 0.147 |
| Percent Pd sintering | 11.1% | 77.7% |

The degree of Pd dispersion indirectly represents the degree of probability of contact between Pd and exhaust gas. The higher the degree of Pd dispersion, the higher the contact efficiency between Pd and exhaust gas. As is clear from the data shown in Table 4, percent deterioration of the Pd dispersion degree was suppressed through employment of barium hexaaluminate as a Pd carrier. That is, Pd sintering was prevented after long-term use of the catalyst product under high-temperature conditions.

The invention claimed is:

1. An exhaust gas purifying catalyst, comprising barium hexaaluminate, and palladium and barium which are supported on barium hexaaluminate, wherein the amount of supported palladium, as reduced to metallic Pd, is 1.0 to 3.5 mass % with respect to the mass of barium hexaaluminate; the amount of supported barium, as reduced to BaO, is 2 to 15 mass % with respect to the mass of barium hexaaluminate; and the ratio by mole of supported barium to supported palladium, Ba/Pd, is (2 to 4.6)/1.

2. The exhaust gas purifying catalyst according to claim 1, wherein the barium hexaaluminate is $Ba_xAl_yO_z$, wherein x is 0.75 to 1, y is 10.9 to 12, and z is 17.14 to 19.

3. An exhaust gas purifying catalyst product, characterized by comprising a catalyst support made of a ceramic or metallic material, and a layer which is formed of an exhaust gas purifying catalyst as recited in claim 1 as a predominant component and which is supported on the catalyst support.

4. An exhaust gas purifying catalyst product, characterized by comprising a catalyst support made of a ceramic or metallic material, and a layer which is formed of an exhaust gas purifying catalyst as recited in claim 2 as a predominant component and which is supported on the catalyst support.

5. A method for producing an exhaust gas purifying catalyst product, compressing:
dispersing a barium hexaaluminate first slurry which has been subjected to wet grinding in an aqueous solution containing a water-soluble palladium compound and a water-soluble barium compound, to thereby form a second slurry, wherein the secondary slurry having the amount of supported palladium, as reduced to metallic Pd, is 1.0 to 3.5 mass % with respect to the mass of barium hexaaluminate; the amount of supported barium, as reduced to BaO, is 2 to 15 mass % with respect to the mass of barium hexaaluminate and the ratio by mole of supported barium to supported palladium, Ba/Pd, is (2 to 4.6)/1;
applying the second slurry onto a catalyst support made of a ceramic or metallic material; and
drying and firing the second slurry applied on the catalyst support.

\* \* \* \* \*